US006273972B1

United States Patent
Andler

(10) Patent No.: US 6,273,972 B1
(45) Date of Patent: Aug. 14, 2001

(54) STRATIFIED COMPOSITE MATERIAL FOR SLIDING ELEMENTS AND METHOD FOR THE PRODUCTION THEREOF

(75) Inventor: Gerd Andler, Frankfurt (DE)

(73) Assignee: Federal-Mogul Wiesbaden GmbH & Co.KG, Wiesbaden (DE)

(*) Notice: Subject to any disclaimer, the term of this patent is extended or adjusted under 35 U.S.C. 154(b) by 0 days.

(21) Appl. No.: 09/367,132
(22) PCT Filed: Nov. 24, 1998
(86) PCT No.: PCT/DE98/03483
  § 371 Date: Aug. 5, 1999
  § 102(e) Date: Aug. 5, 1999
(87) PCT Pub. No.: WO99/36210
  PCT Pub. Date: Jul. 22, 1999

(30) Foreign Application Priority Data

Jan. 14, 1998 (DE) .............................. 198 01 074

(51) Int. Cl.[7] .................. B32B 15/01; B22D 11/122; B22D 19/08; C22C 9/01; C22C 9/04
(52) U.S. Cl. .................. 148/522; 148/531; 148/532; 148/533; 428/653; 428/659; 384/912
(58) Field of Search .................. 148/522, 531–533; 428/653, 659; 384/912

(56) References Cited

U.S. PATENT DOCUMENTS 4,994,235 * 2/1991 Shirosaki et al. .
5,137,792 * 8/1992 Hodes et al. .

FOREIGN PATENT DOCUMENTS

| 1 063 343 | 8/1959 | (DE) . |
| 1714 | 11/1981 | (DE) . |
| 17 660 | 11/1982 | (DE) . |
| 39038234 | 5/1990 | (DE) . |
| 44 11 762 A1 | 10/1995 | (DE) . |
| 0 681 114 A2 | 11/1995 | (DE) . |

* cited by examiner

Primary Examiner—Deborah Jones
Assistant Examiner—Jason Savage
(74) Attorney, Agent, or Firm—Herbert Dubno

(57) ABSTRACT

A composite multilayer material and a method for the production thereof are described which are suitable for bearing points subject to mixed friction, said material being corrosion-resistant and cold-formable and capable of withstanding extremely high loads. According to the method, the backing material is preheated to a temperature of 1000° C. to 1100° C., a heterogeneously developing, lead-free copper-zinc- or copper-aluminum-based bearing alloy at a temperature of from 1000° C. to 1250° C. is cast thereon, and the composite multilayer material is cooled from the casting temperature of the bearing alloy to 100° C. within 2 to 4 minutes. A metallurgical bond zone (2) is present between the bearing alloy (3) and the backing material (1), which metallurgical bond zone (2) comprises 80–95% iron and the usual impurities, the rest being copper, and is crystallised in cubic form.

10 Claims, 3 Drawing Sheets

CuZn40Al
As cast
⊢⎯⎯⎯⎯⎯⎯⊣
100 μm

CuZn40Al
As cast
⊢⎯⊣
10 μm

STRATIFIED COMPOSITE MATERIAL FOR SLIDING ELEMENTS AND METHOD FOR THE PRODUCTION THEREOF

CROSS REFERENCE TO RELATED APPLICATIONS

This application is a national stage of PCT/DE98/03483 filed Nov. 24, 1998 and based upon German national application 198 01 074.5 of Jan. 14, 1998 under the International Convention.

FIELD OF THE INVENTION

The invention relates to a method for the production of a composite multilayer material for sliding elements, such as bearing shells or bearing bushes, in which a bearing alloy is applied to a backing material, in particular of steel, by means of a continuous strip cast-coating process. The invention also relates to a composite multilayer material.

BACKGROUND OF THE INVENTION

In general, bearing systems serve to absorb and transmit forces, both axial and radial, between components moving relative to one another. This means that bearings are necessary for virtually all orbital, rotary or swivelling motions. Bearings are thus an indispensable element of all machines and assemblies and in particular in internal combustion engines.

A study of the most important bearing points (main bearing, connecting rod bearing, small end bearing bush, camshaft bush etc.) in modern internal combustion engines provides a good overview of the multiplicity of frequently contradictory properties which the bearing material must exhibit. Depending on the type of bearing and engine involved, account may have to be taken not only of different structural conditions, but also of wholly different types of load (gas forces, inertia forces, sliding speeds). Over the course of time, composite materials exhibiting a multilayer structure have proven particularly well suited to meeting the resultant varied requirements (high fatigue strength, good wear resistance, low susceptibility to scoring, high corrosion resistance, high cavitation resistance etc) . Thus, two- and three-layer composite materials today constitute part of the prior art. In such an instance, a steel backing member lends a plain bearing the necessary mechanical strength and provides the correct interference fit in the housing. The bearing metal, applied by roll-bonding, strip cast-coating or sintering, provides the above-mentioned properties, an additional overlay, generally applied by electroplating and having an intermediate layer acting as a diffusion barrier, completing the composite system.

Development trends in relation to the diesel engines of the future show two main marginal requirements: minimization of fuel consumption and reduction in pollutant emissions. In comparison to conventional diesel engines, this is achieved by means of direct injection, i.e. increasing combustion pressure, and by turbocharging. Hence, in new generations of engines, extremely high demands are made particularly of bearing materials. Clearly, the trend is towards materials exhibiting ever higher load-carrying capacities, which has already resulted, in the case of connecting rod bearings, in new composite multilayer materials. Thus, in this field the sputter bearing (the overlay consists of a sliding layer applied by means of cathodic sputtering) has become a commercial fixture. With this type of bearing, extremely high loads may be carried without difficulty.

However, in other areas too, such as small end bearings, the demands made of bearing materials have also risen, to such an extent that they can only be met by the steel/lead-bronze-based bush materials traditionally used in this field by increasing the small end diameter, which results in reduced specific loading. However, this development is a move in the wrong direction, since it results in an increase in the oscillating masses and thus in the structural height of the engine, which runs counter to the general desire for weight reduction. A further problem in using lead-bronze alloys is their inadequate corrosion resistance.

From this it is clear that, in the sphere of bush materials for example, future market requirements will be fulfillable only by the development of a new composite material system. Of this the following technical and economic demands will be made: the composite material must be able to withstand loads of the highest order, it must exhibit a high level of corrosion resistance at temperatures of up to 200° C. in an aggressive environment (material highly stressed by oil additives, combustion residues in the oil and heavy contamination of the oil as a result of relatively long intervals being maintenance checks) and it must be cost-effective to produce.

In EP 0 681 114, a composite multilayer material is described which consists of steel with a plain bearing material of a copper-zinc wrought alloy, as used for bearing bushes or thrust washers. Production of this composite material is effected by means of roll-bonding. Heat treatment subsequent to the roll-bonding increases the bond strength between the steel and the bearing metal as a consequence of diffusion processes.

In contrast to the method claimed in this application, production of this composite system entails a roll-bonding process. The roll pressure results in mechanical adhesion of the two materials by interlinking of the surfaces. Although subsequent homogenization strengthens this bond, it does not result in a positive connection or even a metallurgical bond, as is the case with coating by casting, i.e. contact between a liquid phase and a solid phase.

Furthermore, it should be noted that the process described in EP 0 681 114 is also more expensive to carry out, by comparison, than is coating by casting, since before the composite material is produced by roll-bonding, the CuZn31Si strip has to be produced by its own casting process. The composite material is produced by roll-bonding only in a further stage. However, with coating of steel by casting the composite material may be produced in a single stage.

DE-OS 25 48 941 describes a method of producing strand-form, metallic items, in which method several layers of the same material are applied. Consequently, several coating vessels are provided. The layer which is respectively formed on the strip at the coating point is continuously drawn off and cooled. To this end, appropriate cooling devices are provided beneath the strip.

A method of strip-casting lead-bronze is known from DE-PS 10 63 343, in which the steel strip is heated to a temperature of approximately 1100° C., to prevent distortion of the strip. The strip is previously formed into a U-shaped profile with bent edges. After cast-coating and cooling of the strip, which, however, is not described at all, the strip is milled to the desired thickness and then coiled.

A method of producing a steel composite cast material is known from DE 44 37 565 A1. This method is not a continuous strip cast-coating process, but rather a vertical or centrifugal casting process, in which bearing shells which have already been shaped are coated. This copper-based bearing alloy contains nickel and silicon in a given ratio, such that the brittle iron silicide phases are suppressed in the bond zone. The sliding element to be coated is preheated, the temperature to which it is preheated being selected as a function of the thickness of the steel. This method is suitable only for large bearings and thus expensive components. This known method cannot be used for mass production, as is necessary in the case of bearings of smaller size with steel thicknesses below 10 mm.

OBJECT OF THE INVENTION

Taking as basis DE-OS 25 48 941, the object of the invention is to provide a method and a composite multilayer material suitable for bearing points subject to mixed friction, said material being corrosion-resistant and cold-formable and capable of withstanding extremely high loads.

SUMMARY OF THE INVENTION

The object is achieved by a method in which the backing material is preheated to a temperature of 1000° C. to 1100° C. and a heterogeneously developing, lead-free copper-zinc- or copper-aluminum-based bearing alloy at a temperature of from 1000° C. to 1250° C. is cast thereon. The composite multilayer material is cooled from the casting temperature of the bearing alloy to below 100° C. within 2 to 4 minutes.

The composite multilayer material is preferably cooled from the casting temperature of the bearing alloy to its solidification temperature within the first 30 secs.

It has been shown that the requirements of composite multilayer materials may be met using high-strength copper alloys. These include high-strength brass or aluminum-bronze, which, in addition to high load-carrying capacities, have the advantage, from the environmental point of view, of not containing any lead. This group of materials is based in principle on two different structural morphologies: alloy systems which solidify homogeneously (e.g. CuAl8 or CuZn31Si) and alloy systems which form a heterogeneous structure (e.g. CuAl8 or CuZn4OAl)

The "homogeneous" materials comprise an α-mixed crystal and, in addition to good sliding characteristics, also exhibit good cold-formability. In contrast, the multi-phase structural composition of the "heterogeneous" alloys promotes relatively high wear resistance, but results in inferior cold-formability.

It has hitherto been possible to produce composite materials with copper-zinc- or copper-aluminum-based bearing alloys only by centrifugal casting methods. Continuous strip cast-coating processes could not hitherto be used, since brittle phases formed in the area of the bond zone during coating by casting of the substrate material, which meant that the composite material could not be formed into shape. However, such forming is imperative, if plain bearings or bushes, for example, are to be produced cost-effectively. It has been surprisingly noted that these composite materials become formable without the cast-on bearing metal becoming detached from the substrate material, when, for example, the process parameters according to the invention are adhered to. Management of the steel cast-coating process makes it possible to produce a composite material which altogether permits forming of at least 25%.

The bond zone at the interface with the steel exhibits adequate ductility, i.e. the formation of brittle phases at the steel/bearing metal interface was prevented. Thus, the prerequisites for further processing of the multilayer composite in strip form by forming processes such as rolling or edge coiling, to produce a bush for example, were met.

If the bearing alloy is a copper-aluminum alloy, annealing at 600° C. to 750° C. is preferably carried out for 4 to 10 hours after application of the bearing alloy and after the cooling process. In the case of a copper-zinc alloy, the composite multilayer material is appropriately advantageously annealed at a temperature of 400° C. to 550° C. for 4 to 10 hours.

The bearing alloy is preferably cast to a thickness $D_L$, which, in relation to the thickness $D_T$ of the backing material, exhibits the ratio $D_L/D_T=1$ to 2. Formation of the bond zone may be influenced via the thickness ratio.

The composite multilayer material for bearing shells or bearing bushes is characterized in that the bearing alloy is lead-free and is based on copper-zinc or copper-aluminum and exhibits a heterogeneous structural composition, wherein a metallurgical bond zone is present between the bearing alloy and the backing material, which metallurgical bond zone comprises 80 to 95% iron and the usual impurities, the rest being copper, and is crystallized in cubic form.

The alloy components of the bond layer are advantageously determined by energy-dispersive X-ray analysis (EDX) by means of scanning electron microscopy. A metallurgical bond zone is a bond zone which develops as a clearly recognizable intermediate layer as a result of diffusion of, for example, elements of the cast-on alloy into the solid backing material. In general, this bond zone consists of a mixed crystal or intermetallic phase of the two materials.

The high iron content originates from the steel backing material, while the copper content is provided by the bearing alloy. Apart from these two components, which determine the structure of the metallurgical bond zone, small amounts of the other alloy constituents may also be present. This metallurgical bond zone ensures high adhesive strength and a high load-carrying capacity of the entire composite multilayer material.

The thickness of the bond zone preferably ranges from 5 to 50 μm.

The heterogeneous structure of the bearing alloy could be disadvantageous from the point of view of the cold-formability of the material. However, it has surprisingly emerged that the heterogeneous structure is not disadvantageous when there is a properly proportioned ratio between the α and β phases.

The β phases arise at high temperatures and have, in order to ensure good formability, inter alia, to be converted into the α phase. On the other hand, sufficient proportions of β phases do also have to be present to maintain the heterogeneous nature of the structure, because this has a good influence on wear resistance.

Conversion of the β phases may be controlled by cooling after casting-on; however, from an economic standpoint, it is desirable for cooling to be as rapid as possible. It has emerged that cooling to 100° C. within 2 to 4 minutes is suited to establishing a ratio of α phases to β phases of 1.5 to 3.0. A composite multilayer material with such an α to β ratio combines good tribological properties with good formability together with good corrosion properties and a high load-carrying capacity.

The ratio of α phases to phases may be further increased to as much as 6 by the subsequent annealing process, which has a favorable effect on forming characteristics.

The composite multilayer material is preferably used for sliding elements, such as plain bearings or bushes, with a backing material thickness of less than 10 mm.

The copper-zinc alloy may, for example, exhibit the following composition:

| | |
|---|---|
| copper | 55–63% |
| aluminum | 1.5–2.5% |
| iron | 0.5–0.8% |
| manganese | 1.8–2.2% |
| nickel | 0.7–1% |
| tin | 0–0.1% |
| zinc | remainder. |

A copper-aluminum alloy may, for example, be composed as follows:

| | |
|---|---|
| aluminum | 7.5–11% |
| iron | 0.5–3% |
| manganese | 0.5–2% |
| nickel | 1–3.5% |
| zinc | 0–0.5% |
| copper | remainder. |

The composite multilayer material may additionally comprise a ternary layer, for example of PbSnCu, or a tin flash acting as a running-in layer.

BRIEF DESCRIPTION OF THE DRAWING

Exemplary embodiments are described in more detail below with the aid of the drawings, in which.

SPECIFIC DESCRIPTION AND EXAMPLES

Example 1

CuAl9Ni3Fe

| | |
|---|---|
| 1.6 mm steel strip coating of steel strip by casting | backing material preheated to 1100° C. melting point of bearing alloy 1200° C. |
| cooling | in 30 secs to solidification temperature, in further 2.5 mins to 100° C. |
| milling of bearing metal surface | 5–15% of bearing metal thickness |
| heat treatment | 650° C., 6 hours holding time |
| forming process | 25% |

Figure 1:
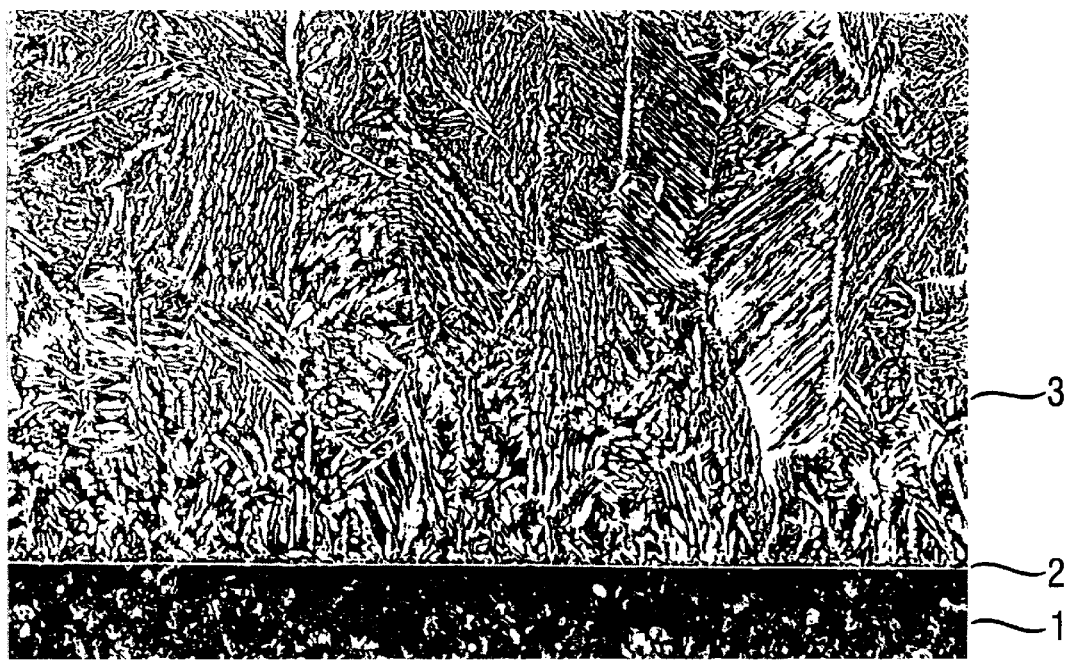
FIG. 1 is a photomicrograph of a CuAl9Ni3Fe bearing alloy as cast on a steel backing material.

A photomicrograph of this composite multilayer material as cast may be seen in FIG. 1. A thin bond zone 2 is present on the steel backing material 1 and consists of 88% iron and 6% copper, the rest consisting of the other alloy constituents.

The bearing alloy 3 is located on the bond zone 2 and comprises a heterogeneous, dendritic structure, wherein the light areas represent the α phase. The 60 and β phases are present in the bearing alloy 3 in the ratio 2.6.

Example 2

CuZn4OAl2

| | |
|---|---|
| 1.6 mm steel strip coating of steel strip by casting | backing material preheated to 1000° C. melting point of bearing alloy 1020° C. |
| cooling | in 30 secs to solidification temperature, in further 2.5 mins to 100° C. |
| milling of bearing metal surface | 5–15% of bearing metal thickness |
| heat treatment | 500° C., 4 hours holding time |
| forming process | 25% |

Figure 2A:
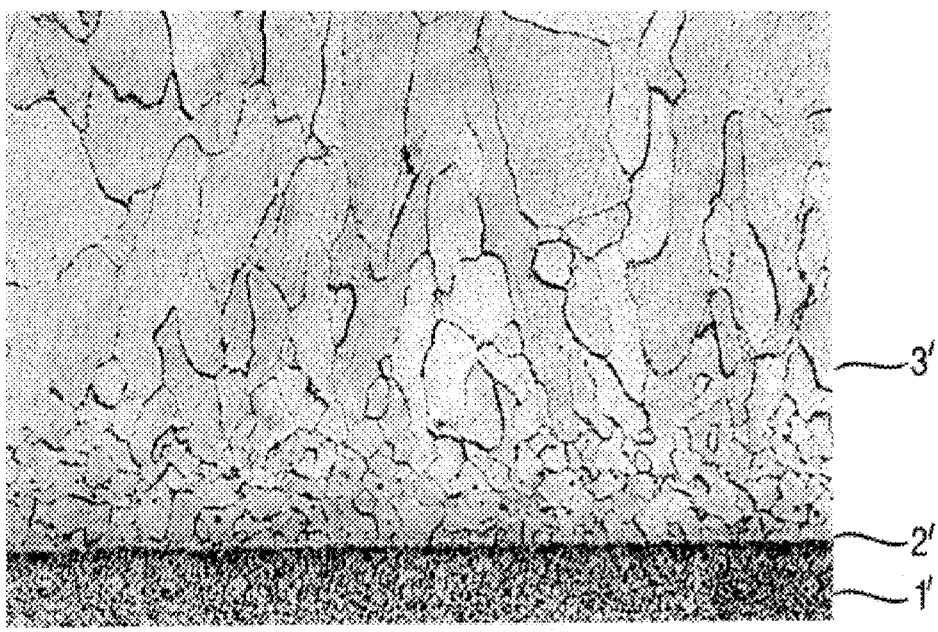
FIGS. 2a and 2b are two photomicrographs of a composite multilayer material with a bearing alloy of CuZn4OAl as cast and FIG. 3 is a bar chart directly comparing the bond strength of the composite materials CuAl9Ni3Fe2 and CuZn4OA12 respectively on steel as cast and after heat treatment with conventional composite multilayer materials.
Figure 2B:

FIGS. 2a and 2b are photomicrographs of the composite multilayer material with the bearing alloy CuZn4OAl2 as cast. Between the steel backing layer 1' and the bearing material 3' there is again a bond zone 2', which comprises 81% iron and 8% copper, the rest consisting of the other alloy constituents.

This material also exhibits a heterogeneous structure.

Figure 3:
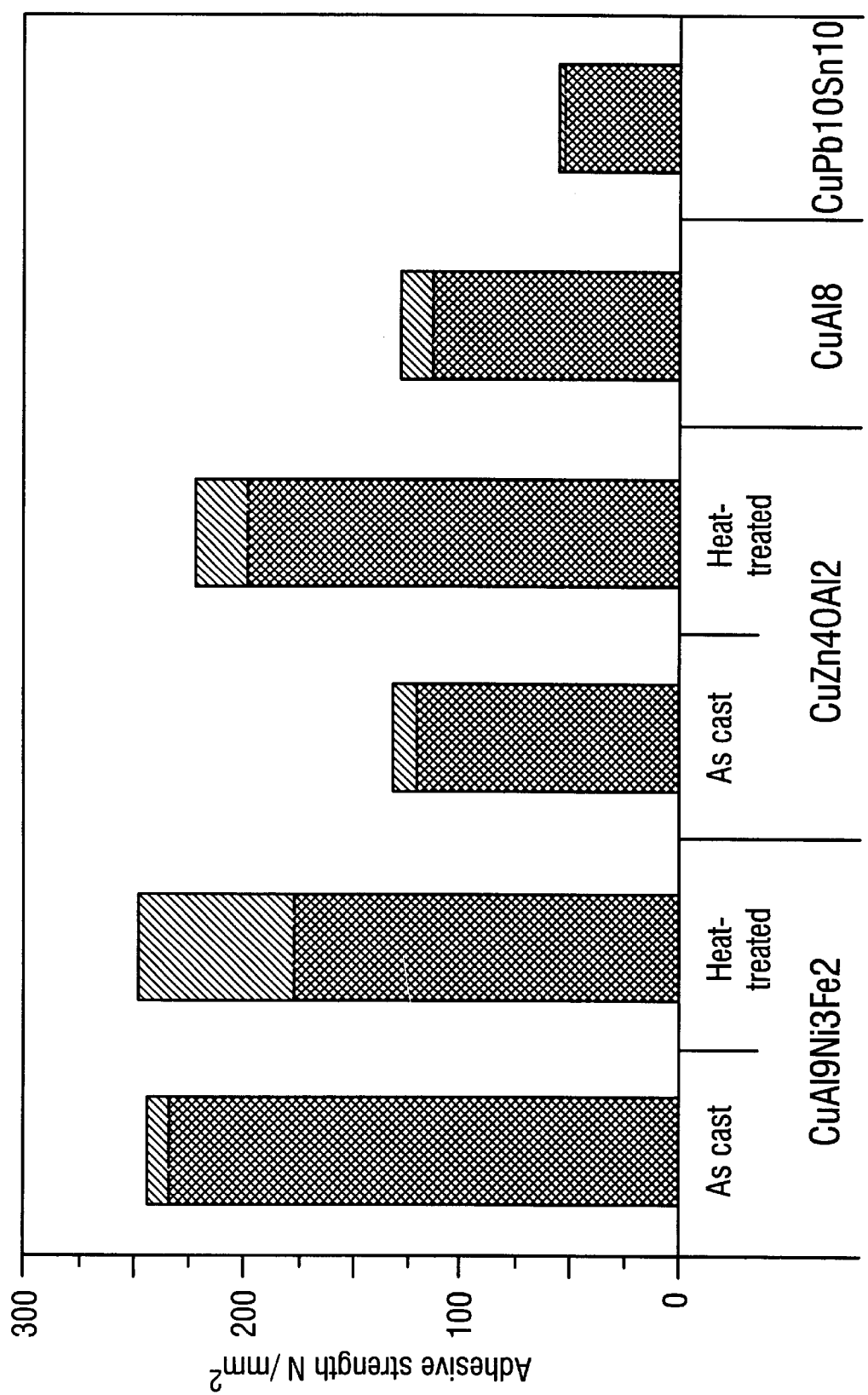

FIG. 3 shows the bond strength in $N/mm^2$ for composite materials produced according to exemplary embodiments 1 or 2 compared with conventional composite multilayer materials. The grey area denotes measured value control. Both the cast state and the state after annealing were investigated in relation to CuAl9NiFe2 and CuZn40Al2. It is clear that the two new composite materials are markedly superior to known steel composite materials such as CuAl8 or CuPb10Sn10 with regard to adhesive strength. Heat treatment, carried out to establish the structural composition desired for subsequent forming does not have a negative effect on adhesive strength (in the case of CuZn40Al2 applied to steel, adhesive strength is even improved.)

What is claimed is:

1. A method of making a layered bearing element comprising the steps of:
   (a) preheating steel strip forming a carrier material for said layered bearing element to a temperature of 1000° C. to 1100° C. to produce a preheated steel strip;
   (b) in a continuous strip casting process, casting onto the preheated steel strip a lead-free copper-zinc or copper-aluminum bearing alloy at a casting temperature of 1000° C. to 1250° C. to form a heterogeneous bearing layer on the steel strip and produce a layered product;
   (c) cooling the layered product from said casting temperature to 100° C. over a period of 2 to 4 minutes to produce an α phase and a β phase in said layer with said α phase and said β phase being present in a ratio of 1.5 to 3 in said layer; and
   (d) thereafter annealing the layered product to raise said ratio to 6.

2. The method defined in claim 1 wherein the layered product is cooled in step (c) from said casting temperature to a solidification temperature of the cast bearing layer within the first 30 seconds after casting.

3. The method defined in claim 1 wherein the bearing layer applied is the copper-aluminum bearing alloy and the layered product is annealed in step (d) at 600° C. to 750° C. over a period of 4 to 10 hours.

4. The method defined in claim 1 wherein the bearing layer is composed of the copper-zinc bearing alloy and the annealing in step (c) is carried out at a temperature of 400° C. to 550° C. over a period of 4 to 10 hours.

5. The method defined in claim 1 wherein the bearing layer is cast in a thickness $D_L$ and said thickness $D_L$ is in a ratio to the thickness $D_T$ of the carrier material of $D_L/D_T = 1$ to 2.

6. A composite multilayer sliding bearing element formed by the method of claim 1, wherein said slide bearing element comprises a carrier material in the form of a steel strip and a bearing layer cast onto said steel strip which consists of a lead-free copper-zinc or copper-aluminum bearing alloy with a heterogeneous structure and wherein a metallurgical bond zone of cubic structure is present between the bearing alloy and the carrier material which comprises 90–95% iron, the balance copper and usual impurities, the heterogeneous structure of said bearing layer comprising an α and a β phase.

7. The bearing element defined in claim 6 wherein said bond zone has a thickness of 5 to 50 μm.

8. The bearing element defined in claim 6 wherein said bearing alloy has the following composition:

| | |
|---|---|
| copper | 55–63% |
| aluminum | 1.5–2.5% |
| iron | 0.5–0.8% |
| manganese | 1.8–2.2% |
| nickel | 0.7–1% |
| tin | 0–0.1% |
| zinc | remainder. |

9. The bearing element defined in claim 6 wherein said bearing alloy has the following composition:

| | |
|---|---|
| aluminum | 7.5–11% |
| iron | 0.5–3.0% |
| manganese | 0.5–2.0% |
| nickel | 1.0–3.5% |
| zinc | 0–0.5% |
| copper | remainder. |

10. The bearing element defined in claim 6, further comprising a tin flashing layer on said bearing layer.

* * * * *